US012654573B2

(12) United States Patent
Bech et al.

(10) Patent No.: US 12,654,573 B2
(45) Date of Patent: Jun. 16, 2026

(54) ELECTRIC VEHICLE CHARGING ARRANGEMENT AND METHOD FOR CHARGING AN ELECTRIC VEHICLE

(71) Applicant: ABB E-MOBILITY B.V., Delft (NL)

(72) Inventors: Lars Peter Bech, Schiedam (NL); Stefan Raaijmakers, Delft (NL); Mengxi Zhou, Rotterdam (NL)

(73) Assignee: ABB E-Mobility B.V., Delft (NL)

( * ) Notice: Subject to any disclaimer, the term of this patent is extended or adjusted under 35 U.S.C. 154(b) by 827 days.

(21) Appl. No.: 17/898,673

(22) Filed: Aug. 30, 2022

(65) Prior Publication Data

US 2023/0061714 A1     Mar. 2, 2023

(30) Foreign Application Priority Data

Aug. 30, 2021     (EP) ..................................... 21193847

(51) Int. Cl.
*B60L 53/10*          (2019.01)
*B60L 3/00*           (2019.01)
(Continued)

(52) U.S. Cl.
CPC ............. *B60L 53/11* (2019.02); *B60L 3/0046* (2013.01); *H02J 7/875* (2026.01); *H02M 1/32* (2013.01); *H02M 1/36* (2013.01)

(58) Field of Classification Search
CPC ......... B60L 53/11; B60L 3/0046; H02M 1/32; H02M 1/36; H02J 7/875
See application file for complete search history.

(56) References Cited

U.S. PATENT DOCUMENTS 7,886,857 B2      2/2011   Yoshinori
10,476,262 B2 *  11/2019   Burkman .............. B60L 3/0046
(Continued)

FOREIGN PATENT DOCUMENTS

CN        108068632     *   3/2021
EP        3564059 A1     11/2019
EP        4140800 A1 *    3/2023   .............. H02M 1/36

OTHER PUBLICATIONS

"Electric vehicle conductive charging system—Part 23: DC electric vehicle charging station", IEC 61851-23:2014, Mar. 11, 2014, Abstract Only.
(Continued)

*Primary Examiner* — Richard V Muralidar
(74) *Attorney, Agent, or Firm* — McCarter & English, LLP; Michael M. Gnibus

(57) ABSTRACT
Described herein is an electric vehicle charging arrangement for charging an electric vehicle, including an electric vehicle supply equipment (EVSE). The EVSE includes a power module configured for providing electrical energy to charge the electric vehicle, an output configured for connecting the power module to the electric vehicle for charging the electric vehicle, and a direct current (DC) bus having a DC+ line and a DC− line and provided between and connected to the power module and the output and configured for transporting electric energy from the power module to the output. Each of the DC+ the DC− lines is provided with a contactor configured for selectively allowing a current flow from the power module to the output. A first pre-charge circuit is provided in parallel to the contactor of the DC+ line, and a second pre-charge circuit is provided in parallel to the contactor of the DC− line.

13 Claims, 2 Drawing Sheets

(51) Int. Cl.
  *H02J 7/00*          (2006.01)
  *H02M 1/32*          (2007.01)
  *H02M 1/36*          (2007.01)

(56)                References Cited

U.S. PATENT DOCUMENTS

| | | | |
|---|---|---|---|
| 12,515,543 B2 * | 1/2026 | Raaijmakers | ........... B60L 53/14 |
| 2014/0021916 A1 * | 1/2014 | Bilezikjian | ........... B60L 3/0092 |
| | | | 320/109 |
| 2015/0097525 A1 | 4/2015 | Roger et al. | |
| 2015/0274024 A1 | 10/2015 | Da Costa et al. | |
| 2017/0166075 A1 | 6/2017 | Hong et al. | |
| 2020/0406768 A1 | 12/2020 | Pfeilschifter et al. | |
| 2022/0037983 A1 * | 2/2022 | Jiao | ......................... H02M 1/08 |
| 2022/0219542 A1 * | 7/2022 | Wang | ....................... B60L 3/12 |

OTHER PUBLICATIONS

Extended European Search Report issued in EP Application No. 21193847.7, dated Feb. 14, 2022, 10 pages.

* cited by examiner

ELECTRIC VEHICLE CHARGING ARRANGEMENT AND METHOD FOR CHARGING AN ELECTRIC VEHICLE

CROSS-REFERENCE TO RELATED APPLICATION

This application claims priority to European Patent Application No. 21193847.7, filed Aug. 30, 2021, and titled "ELECTRIC VEHICLE CHARGING ARRANGEMENT AND METHOD FOR CHARGING AN ELECTRIC VEHICLE", which is hereby incorporated by reference in its entirety.

BACKGROUND

The present disclosure relates to an electric vehicle charging arrangement for charging an electric vehicle, including an electric vehicle supply equipment. Furthermore, the present disclosure relates to a method for charging an electric vehicle by an electric vehicle charging arrangement.

Such an electric vehicle charging arrangement is known, wherein the known electric vehicle charging arrangement includes a power module configured for providing electrical energy to charge the electric vehicle and an output configured for connecting the power module to the electric vehicle for charging the electric vehicle. A direct current (DC) bus with a DC+ line and a DC− line is provided between and connected to the power module and the output and configured for transporting electric energy from the power module to the output. Each of the DC+ line and the DC− line is provided with a contactor configured for selectively allowing a current flow from the power module to the output. Furthermore, a pre-charge circuit, having a pre-charge resistor, is provided in parallel to the contactor of one of the DC+ line or the DC− line.

BRIEF DESCRIPTION

Before starting the charging of an electric vehicle after connecting the electric vehicle to the electric vehicle supply equipment, pre-charging of the output of the electric vehicle supply equipment has to be performed. During pre-charging, the vehicle battery of the electric vehicle is not connected to the DC bus yet, because the contactors of the DC+ line and the DC− line are in the open position. Pre-charging involves charging the voltage at the output near to the battery voltage of the vehicle battery, with a ±20V tolerance, and charging the internal capacitors at the output to prevent or to limit a high inrush current when the vehicle battery is connected to the DC bus. If the high inrush current is not prevented or limited, the contactors of the DC+ line and the DC− line may get damaged by the high inrush current.

In the current charging standards, only the pre-charge between the DC+ line and the DC− line is considered. However, there are actually three connections involved between the electric vehicle supply equipment and the electric vehicle to be charged, namely the DC+ line, the DC− line, and the PE (Protective Earth) line. In the known electric vehicle supply equipment, the pre-charge circuit is only used on the DC+ line or on the DC− line. A disadvantage of the known electric vehicle supply equipment is that a high inrush current has been seen on the line without pre-charge circuit due to the Y capacitance and unbalance between the electric vehicle supply equipment and the electric vehicle.

The present disclosure provides an electric vehicle charging arrangement or a method for charging an electric vehicle, in which high inrush currents are prevented from occurring.

According to a first aspect, the present disclosure provides an electric vehicle charging arrangement for charging an electric vehicle, including an electric vehicle supply equipment (EVSE), wherein the EVSE includes:

a power module configured for providing electrical energy to charge the electric vehicle, an output configured for connecting the power module to the electric vehicle for charging the electric vehicle, and a direct current (DC) bus having a DC+ line and a DC− line and provided between and connected to the power module and the output and configured for transporting electric energy from the power module to the output, wherein each of the DC+ line and the DC− line is provided with a contactor configured for selectively allowing a current flow from the power module to the output, and wherein a first pre-charge circuit is provided in parallel to the contactor of the DC+ line, and a second pre-charge circuit is provided in parallel to the contactor of the DC− line.

During use of the electric vehicle charging arrangement according to the present disclosure, pre-charging of the output of the EVSE is performed on each of the DC+ line and the DC− line of the DC bus, and may be performed simultaneously. Since pre-charging is performed on both of the DC+ line and the DC− line of the DC bus, a high inrush current occurring at one of the DC+ line and the DC− line can be limited on both of the DC+ line and the DC− line, or the risk of a high inrush current occurring at one of the DC+ line and the DC− line can be eliminated in the ideal case.

In the context of the present disclosure, the output may be understood to include a charging cable and a charging connector, a pantograph and/or an automatic connection system for connecting an electric vehicle to the EVSE.

Furthermore, in the context of the present disclosure, an electric vehicle supply equipment (EVSE) may be referred to as electric vehicle charger, electric vehicle, EV, charging station, electric recharging point, charging point, charge point, charge post or electronic charging station (ECS). The electric vehicle charger is an element in an infrastructure that supplies electric energy for recharging of electric vehicles, including electric cars, neighborhood electric vehicles, electric busses and plug-in hybrids, for example via a charging cable and a charging connector, via a pantograph and/or via an automatic connection system to the EV. Electric vehicle chargers usually comply with standards for electric vehicle fast charging, such as the so-called Combined Charging System (CCS) protocol according to IEC 61851-23 and SAE J1772 standard for charging electric vehicles both in the US and in the European Union, EU. The Combined Charging System (CCS) protocol is a fast charging method for charging electric vehicles delivering high-voltage direct current via a charging connector derived from SAE J1772 standard (IEC Type 1) or IEC Type 2 connector. The proposed electric vehicle charging arrangement may be advantageously used with even higher charging currents such as or more than 500A, 600A or 3000A, voltages such as or higher than 1000V, 1500V or 3000V and/or in combination with newer standards not yet defined requiring higher currents.

In an embodiment, each of the first pre-charge circuit and the second pre-charge circuit includes a pre-charge resistor. Each of the first pre-charge circuit and the second pre-charge circuit may include a pre-charge relay that is arranged downstream of and in series with the pre-charge resistor. By arranging the pre-charge resistor and the pre-charge relay in series and in parallel to the contactor of the DC+ line and the DC− line, respectively, the pre-charge resistor may be switched to during pre-charging, when the respective contactor is open and the respective pre-charge relay is closed, such that no current may flow through the respective contactor and current may flow through the pre-charge resistor. When pre-charging is completed, the respective pre-charge relay is opened and the associated contactor is closed, such that current may flow through the closed contactor for charging the electric vehicle.

In an embodiment, at least one of the first pre-charge circuit and the second pre-charge circuit includes a pre-charge resistor matrix with a plurality of matrix resistors. In an embodiment, a number of matrix resistors are arranged in series with each other. A number of matrix resistors may be arranged in parallel to each other. It may be disadvantageous when the pre-charge circuit has only a single pre-charge resistor, since once the pre-charge resistor is shorted or has another failure, there will be a huge inrush current, for example, when the contactor is closed. The pre-charge resistor matrix has as an advantage that a huge inrush current may still be limited or even may still be prevented from occurring by one or more of the matrix resistors, when one of the matrix resistors is shorted or has another failure.

Each of the first pre-charge circuit and the second pre-charge circuit may include a pre-charge relay that is arranged downstream of and in series with the pre-charge resistor matrix.

In an embodiment, the EVSE includes one or more X capacitors and/or one or more Y capacitors. By providing one or more X capacitors between the DC+ line and the DC− line, in particular downstream of the first and second pre-charge circuits, the direct current (DC) transported by the DC bus may be filtered by means of such one or more X capacitors.

In an embodiment, the EVSE includes an isolation monitoring device, and/or one or more isolating resistors. During use, it may occur that the resistance, for example, between the DC+ line and earth suddenly drops below a predetermined value. Such a drop of resistance may result in an increased current on the DC bus, which increased current may be detrimental, for example, for the contactors of the DC+ line and the DC− line. The isolation monitoring device is intended to give an alert and/or to disconnect the power module, for example by opening the contactors of the DC+ line and the DC− line, in case of a sudden drop of the resistance, for example between the DC+ line and earth. This is advantageous, as it may prevent a too high current from occurring on the DC bus.

In an embodiment, the DC bus is a first DC bus, the DC+ line is a first DC+ line and the DC− line is a first DC− line, wherein the electric vehicle charging arrangement includes an electric vehicle having a battery, an input configured for being connected or connected to the output of the EVSE, and a second DC bus between the input and the battery, wherein the second DC bus has a second DC+ line and a second DC− line, each provided with a second contactor. When connecting the electric vehicle to the EVSE, the second contactors on the second DC+ line and the second DC− line are open such that the battery of the electric vehicle is not directly connected to the first DC bus and the power module of the EVSE upon connection of the electric vehicle to the EVSE. This is advantageous, as it thereby is prevented that the battery of the electric vehicle is connected to the power module via the pre-charge circuit.

In an embodiment, the DC bus includes a protective earth line.

According to a second aspect, the present disclosure provides a method for charging an electric vehicle by means of an electric vehicle supply equipment (EVSE) including a power module configured for providing electrical energy to charge the electric vehicle, an output configured for connecting the power module to the electric vehicle for charging the electric vehicle, and a direct current (DC) bus having a DC+ line and a DC− line and provided between and connected to the power module and the output and configured for transporting electric energy from the power module to the output, wherein each of the DC+ line and the DC− line is provided with a contactor configured for selectively allowing a current flow from the power module to the output, and wherein a first pre-charge circuit is provided in parallel to the contactor of the DC+ line, and a second pre-charge circuit is provided in parallel to the contactor of the DC− line, wherein the method includes the steps of:

connecting the electric vehicle to the EVSE, in particular the output thereof, while the contactor of each of the DC+ line and the DC− line is open;

pre-charging the output of the EVSE on the DC+ line and the DC− line; and when pre-charging is complete, closing the contactor of each of the DC+ line and the DC− line to start charging the electric vehicle.

The method according to the present disclosure has at least the same technical advantage as described in relation to the electric vehicle charging arrangement according to the first aspect of the present disclosure.

In an embodiment, the DC bus is a first DC bus, the DC+ line is a first DC+ line and the DC− line is a first DC− line, wherein the electric vehicle charging arrangement includes an electric vehicle having a battery, an input configured for being connected or connected to the output of the EVSE, and a second DC bus between the input and the battery, wherein the second DC bus has a second DC+ line and a second DC− line, each provided with a second contactor, wherein the step of connecting the electric vehicle to the EVSE includes connecting the electric vehicle to the EVSE, while the second contactor of each of the second DC+ line and the second DC− line is open.

In an embodiment, the step of, when pre-charging is complete, closing the contactor of each of the DC+ line and the DC− line to start charging the electric vehicle includes closing the second contactor of each of the second DC+ line and the second DC− line.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The present disclosure will be elucidated on the basis of an exemplary embodiment shown in the attached drawings.

DETAILED DESCRIPTION

Figure 1:
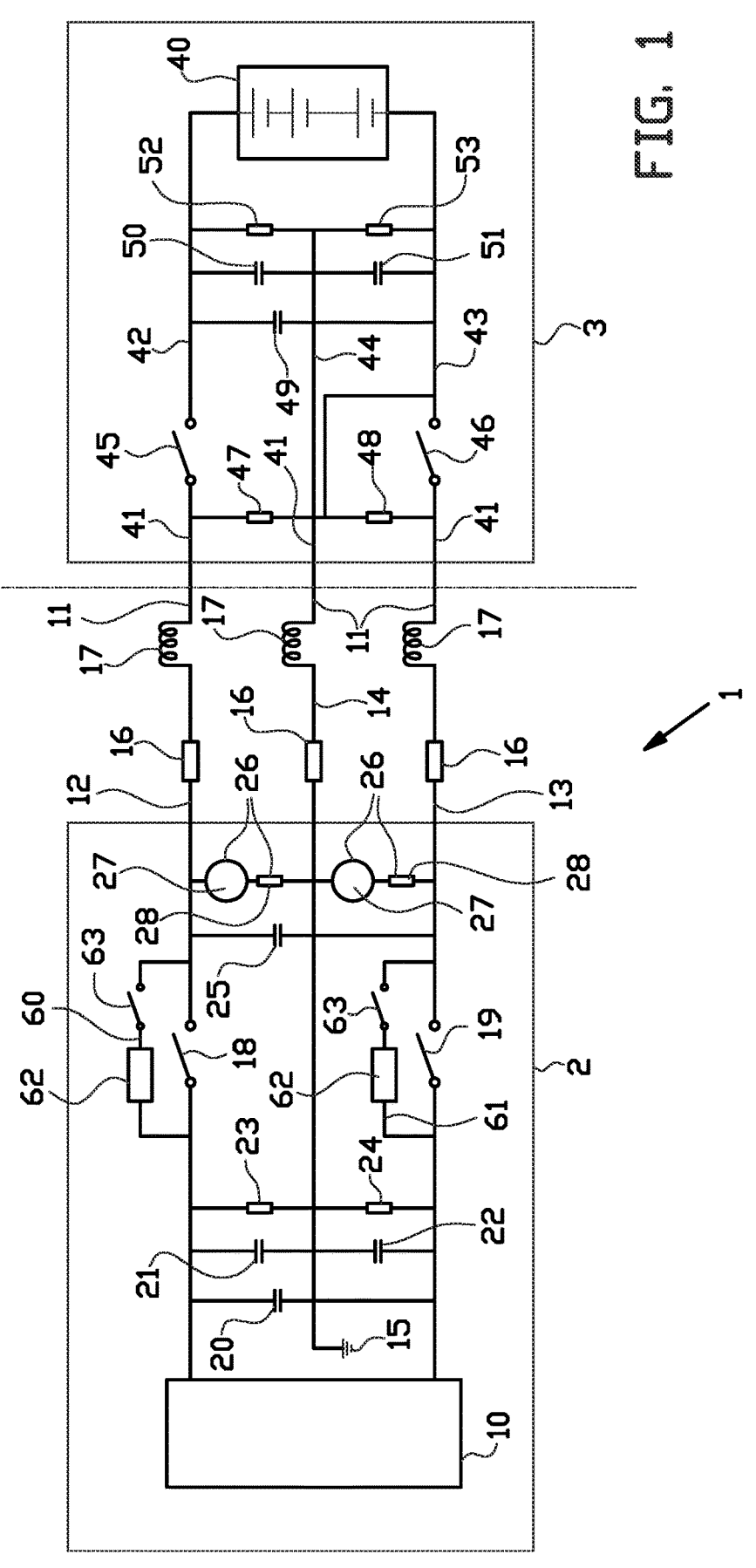
FIG. 1 shows a schematic view of an electric vehicle charging arrangement having an electric vehicle supply equipment with a pre-charge circuit having a pre-charge resistor according to an embodiment of the present disclosure.

A schematic view of an electric vehicle charging arrangement 1 according to an embodiment of the present disclosure is shown in FIG. 1. The electric vehicle charging arrangement 1 is provided with an electric vehicle supply equipment 2, EVSE, for supplying electric energy to an electric vehicle 3 for charging the electric vehicle 3, in particular the battery 40 thereof.

As shown in FIG. 1, the EVSE 2 includes a power module 10 that is configured for receiving electric energy from a not shown power source, wherein the power source may be an alternating current (AC) power source, such as the electricity grid, or a direct current (DC) power source, such as a power cabinet. The power module 10 is configured for converting the received electric energy into a direct current (DC) appropriate for charging the electric vehicle 3. In order to establish an electrical connection between the power module 10 and the electric vehicle 3, the EVSE is provided with a first DC bus 11 and a not shown plug, located at the outside of the EVSE 2, to be inserted into a not shown socket of the electric vehicle 3, as schematically indicated by the dotted line. The plug defines the output of the EVSE 2, wherein the first DC bus 11 extends between the output and the power module 10 and/or is part of the output of the EVSE 2. The socket is at least part of an input of the electric vehicle 3.

Although FIG. 1 seems to show that the power module 10 and the battery 40 of the electric vehicle 3 are connected directly to each other, it is noted that the described plug and socket are provided between the EVSE 2 and the electric vehicle 3. Thus, a plug-and-socket connection is present between the EVSE 2 and the electric vehicle 3 in order to connect them releasable to each other.

The first DC bus 11 includes a first DC+ line 12, a first DC− line 13 and a first protective earth (PE) line 14. The first DC+ line 12 and the first DC− line 13 extend from the power module 10 to the electric vehicle 3, and the PE line 14 extends from an electric earth 15 within the EVSE 2 to the electric vehicle 3. The PE line 14 is provided for directing a fault current safely into the earth and away from a user of the electric vehicle charging arrangement 1 in order to prevent the user from getting an electric shock from the electric vehicle charging arrangement 1. As schematically indicated within FIG. 1, each of the first DC+ line 12, the first DC− line 13 and the first PE line 14 has a line resistance 16 and a line inductance 17 due to the properties of the material used for manufacturing the first DC+ line 12, the first DC− line 13 and the first PE line 14.

As shown in FIG. 1, the first DC+ line 12 has a first DC+ contactor 18 and the first DC− line 13 has a first DC− contactor 19 for selectively connecting the power module 10 of the EVSE 2 to the battery 40 of the electric vehicle 3. Downstream of the power module 10 and upstream of the first DC+ contactor 18 and the first DC− contactor 19, a first X capacitor 20 is provided between the first DC+ line 12 and the first DC− line 13, a first Y capacitor 21 is provided between the first DC+ line 12 and the first PE line 14, and a second Y capacitor 22 is provided between the first DC− line 13 and the first PE line 14. Additionally, a first isolating resistor 23 is provided between the first DC+ line 12 and the PE line 14, and a second isolating resistor 24 is provided between the first DC− line 13 and the PE line 14, both downstream of the power module 10 and upstream of the first DC+ contactor 18 and the first DC− contactor 19.

Downstream of the first DC+ contactor 18 and the first DC− contactor 19, a second X capacitor 25 is provided between the first DC+ line 12 and the first DC− line 13. The second X capacitor 25 is configured to function as a filter for the first DC bus 11 between the first DC+ line 12 and the first DC− line 13. An isolation monitoring device, IMD, 26, having a galvanometer 27 and an isolation monitoring resistor 28, is provided between the first DC+ line 12 and the PE line 14, and between the first DC− line 13 and the PE line 14. Each IMD 26 is configured for monitoring at least the EVSE 2 between the first DC+ line 12 and the first PE line 14, or between the first DC− line 13 and the first PE line 14, respectively, and is configured to give an alert and/or to disconnect the power module 10 from the electric vehicle 3 when a resistance between the first DC+ line 12 and the first PE line 14, or between the first DC− line 13 and the first PE line 14, respectively, drops below a predetermined threshold.

As shown in FIG. 1, the electric vehicle 3 is provided with a second DC bus 41, having a second DC+ line 42, a second DC− line 43 and a second PE line 44, which is configured to be connected to the first DC bus 11 by means of the plug-and-socket connection. Each of the second DC+ line 42 and the second DC− line 43 is provided with a second DC+ contactor 45 and a second DC− contactor 46, respectively, for selectively connecting the battery 40 to the power module 10. Upstream of the second contactors 45, 46, a first measure resistor 47 and a second measure resistor 48 are arranged in series between the second DC+ line 42 and the second DC− line 43. Downstream of the second contactors 45, 46, a third X capacitor 49 is arranged between the second DC+ line 42 and the second DC− line 43, a third Y capacitor 50 is arranged between the second DC+ line 42 and the second PE line 44, and a fourth Y capacitor 51 is arranged between the second DC− line and the second PE line 44. Furthermore, a third isolating resistor 52 is arranged between the second DC+ line 42 and the second PE line 44, and a fourth isolating resistor 53 is arranged between the second DC− line and the second PE line 44.

When the electric vehicle 3 needs to be charged, the second DC bus 41 and the first DC bus 11 are connected to each other by means of the described plug-and-socket connection, while at least the second contactors 45, 46 are open such that the power module 10 is not directly connected to the battery 40 of the electric vehicle 3 upon plugging the plug into the socket. This is done to prevent high inrush current from occurring. The first contactors 18, 19 may also be open. Before closing the first contactors 18, 19 and the second contactors 45, 46, the output of the EVSE 2 is charged to a voltage near to the battery voltage of the battery 40, with a ±20V tolerance, and charging the internal capacitors, such as the first and second X capacitors 20, 25 and the first and second Y capacitors 21, 22, at the output to prevent or to limit a high inrush current when the battery 40 is connected to the DC bus 11 and/or to the power module 10.

In order to perform pre-charging, the EVSE 2 is provided with a first pre-charge circuit 60 parallel to the first DC+ contactor 18, and with a second pre-charge circuit 61 parallel to the first DC− contactor 19. The first and second pre-charge circuits 60, 61 are arranged parallel to the respective first contactor 18, 19, such that the first and second pre-charge circuits 60, 61 are allowed to pre-charge capacitances downstream of the first contactors 18, 19 while the first contactors 18, 19 are open. By providing the first pre-charge circuit 60 on the first DC+ line 12, and the second pre-charge circuit 61 on the first DC− line 13, high inrush currents can be limited or prevented on both of the first DC+ line 12 and the first DC− line 13.

As shown in FIG. 1, each of the first pre-charge circuit 60 and the second pre-charge circuit 61 is provided with a pre-charge resistor 62 and a pre-charge relay 63, which are arranged in series. The pre-charge relay 63 is configured for moving between an open position, in which the respective pre-charge circuit 60, 61 is not enabled to pre-charge, and a closed position, in which the respective pre-charge circuit 60, 61 is enabled to pre-charge.

Figure 2:
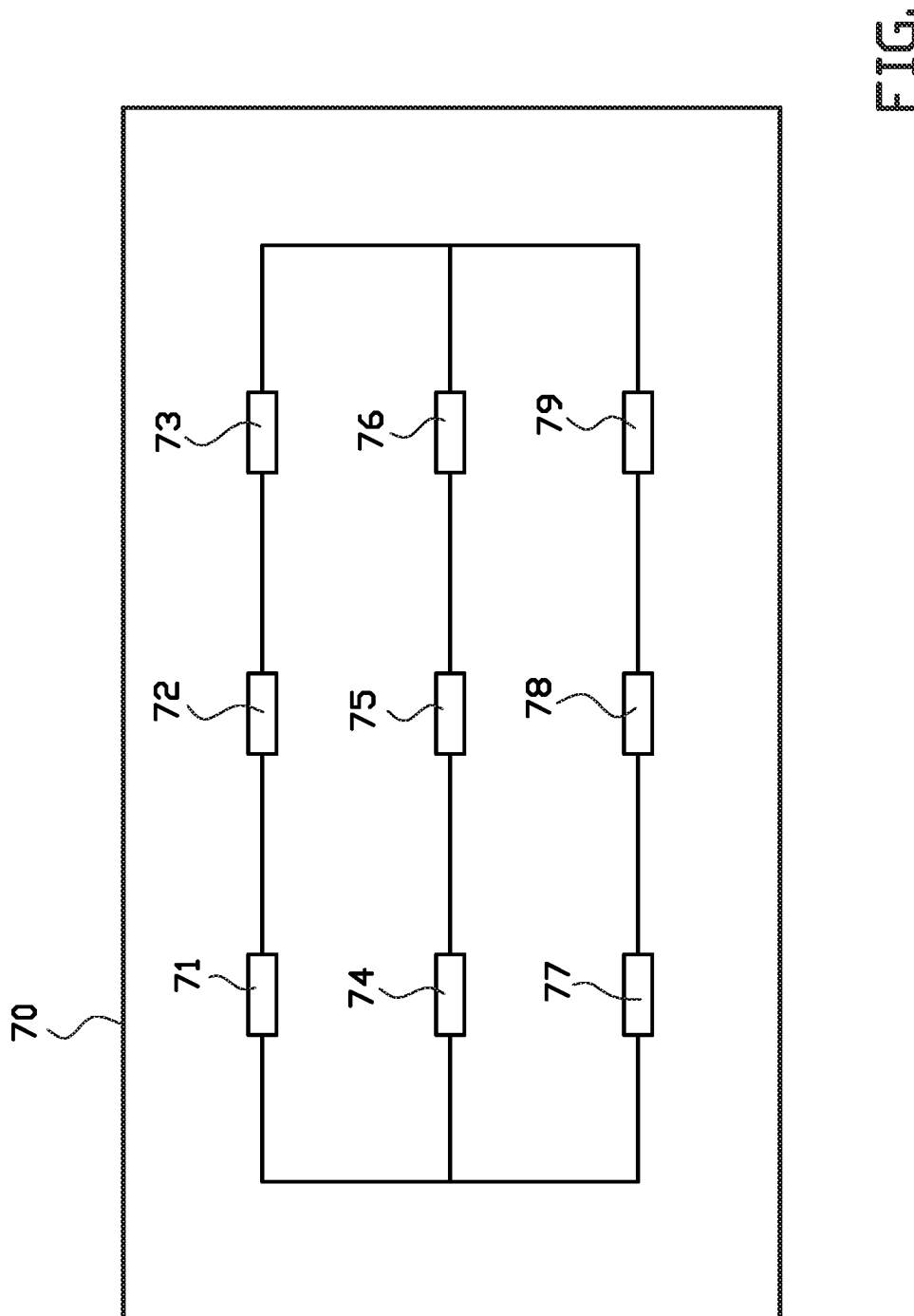
FIG. 2 shows a schematic view of an alternative embodiment of the pre-charge resistor of FIG. 1.

The pre-charge resistor 62 as shown in FIG. 1 is a single pre-charge resistor 62. Alternatively, the pre-charge resistor 62 may be replaced by a pre-charge resistor matrix 70 as shown in FIG. 2. The pre-charge resistor matrix 70 includes a plurality of matrix resistors 71-79. The matrix resistors 71-79 are arranged in such manner that a number of matrix resistors 71-73, 74-76, 77-79 are in series with each other, and that a number of matrix resistors 71-73, 74-76, 77-79 are parallel to each other. The pre-charge matrix 70 has as an advantage that if one of the matrix resistors 71-79, for example matrix resistor 74, is shorted or has another failure, the other remaining matrix resistors 71-73, 75-79 are available to take over the function of the matrix resistor 74 that is shorted or has another failure. It, thereby, is prevented that a huge inrush current occurs in case of a pre-charging resistor that is shorted or has another failure.

It is to be understood that the above description is included to illustrate the operation of the embodiments and is not meant to limit the scope of the present disclosure. From the above discussion, many variations will be apparent to one skilled in the art that would yet be encompassed by the scope of the present disclosure.

The invention claimed is:

1. An electric vehicle charging arrangement for charging an electric vehicle the electric vehicle charging arrangement comprising an electric vehicle supply equipment (EVSE) wherein the EVSE comprises:

a power module configured to provide electrical energy to charge the electric vehicle, an output configured to connect the power module to the electric vehicle for charging the electric vehicle, and a direct current (DC) bus having a DC+ line and a DC-line, wherein the DC bus is disposed between and connected to the power module and the output, and wherein the DC bus is configured to transport electric energy from the power module to the output, wherein each of the DC+ line and the DC-line includes a contactor configured to selectively allow a current flow from the power module to the output, wherein a first pre-charge circuit is disposed in parallel to the contactor of the DC+ line, and a second pre-charge circuit is disposed in parallel to the contactor of the DC-line, and wherein at least one of the first pre-charge circuit and the second pre-charge circuit comprises a pre-charge resistor matrix having a plurality of matrix resistors.

2. The electric vehicle charging arrangement according to claim 1, wherein each of the first pre-charge circuit and second pre-charge circuit comprises a pre-charge resistor.

3. The electric vehicle charging arrangement according to claim 2, wherein each of the first pre-charge circuit and second pre-charge circuit comprises a pre-charge relay that is arranged downstream of and in series with the pre-charge resistor.

4. The electric vehicle charging arrangement according to claim 1, wherein a number of matrix resistors are arranged in series with each other.

5. The electric vehicle charging arrangement according to claim 1, wherein a number of matrix resistors are arranged in parallel to each other.

6. The electric vehicle charging arrangement according to claim 1, wherein each of the first pre-charge circuit and the second pre-charge circuit comprises a pre-charge relay that is arranged downstream of and in series with the pre-charge resistor matrix.

7. The electric vehicle charging arrangement according to claim 1, wherein the EVSE comprises one or more X capacitors and/or one or more Y capacitors.

8. The electric vehicle charging arrangement according to claim 1, wherein the EVSE comprises an isolation monitoring device, and/or one or more isolating resistors.

9. The electric vehicle charging arrangement according to claim 1, wherein the DC bus is a first DC bus, the DC+ line is a first DC+ line and the DC-line is a first DC-line, wherein the electric vehicle charging arrangement comprises an electric vehicle having a battery, an input configured to connect to the output of the EVSE, and a second DC bus between the input and the battery, and wherein the second DC bus has a second DC+ line and a second DC-line, each including a second contactor.

10. The electric vehicle charging arrangement according to claim 1, wherein the DC bus comprises a protective earth (PE) line.

11. A method for charging an electric vehicle utilizing an electric vehicle supply equipment (EVSE), the EVSE comprising:

a power module configured to provide electrical energy to charge the electric vehicle;

an output configured to connect the power module to the electric vehicle for charging the electric vehicle; and a direct current (DC) bus having a DC+ line and a DC-line, wherein the DC bus is disposed between and connected to the power module and the output, and where in the DC bus is configured to transport electrical energy from the power module to the output, wherein each of the DC+ line and the DC-line includes a contactor configured to selectively allow a current flow from the power module to the output, wherein a first pre-charge circuit is disposed in parallel to the contactor of the DC+ line, and a second pre-charge circuit is disposed in parallel to the contactor of the DC-line, and wherein at least one of the first pre-charge circuit and the second pre-charge circuit comprises a pre-charge resistor matrix having a plurality of matrix resistors, wherein the method comprises:

connecting the electric vehicle to the output of the EVSE while the contactor of each of the DC+ line and the DC-line is open;

pre-charging the output of the EVSE on the DC+ line and the DC-line; and when the pre-charging is complete, closing the contactor of each of the DC+ line and the DC-line to start charging the electric vehicle.

12. The method according to claim 11, wherein the DC bus is a first DC bus, the DC+ line is a first DC+ line and the DC-line is a first DC-line, wherein the electric vehicle charging arrangement comprises an electric vehicle having a battery, an input configured to connect to the output of the EVSE, and a second DC bus between the input and the battery, and wherein the second DC bus has a second DC+ line and a second DC-line, each including with a second contactor, wherein connecting the electric vehicle to the EVSE comprises connecting the electric vehicle to the EVSE, while the second contactor of each of the second DC+ line and the second DC-line is open.

13. The method according to claim 12, wherein, when the pre-charging is complete, closing the contactor of each of the DC+ line and the DC-line to start charging the electric vehicle comprises closing the second contactor of each of the second DC+ line and the second DC-line.

* * * * *